Figure 1:
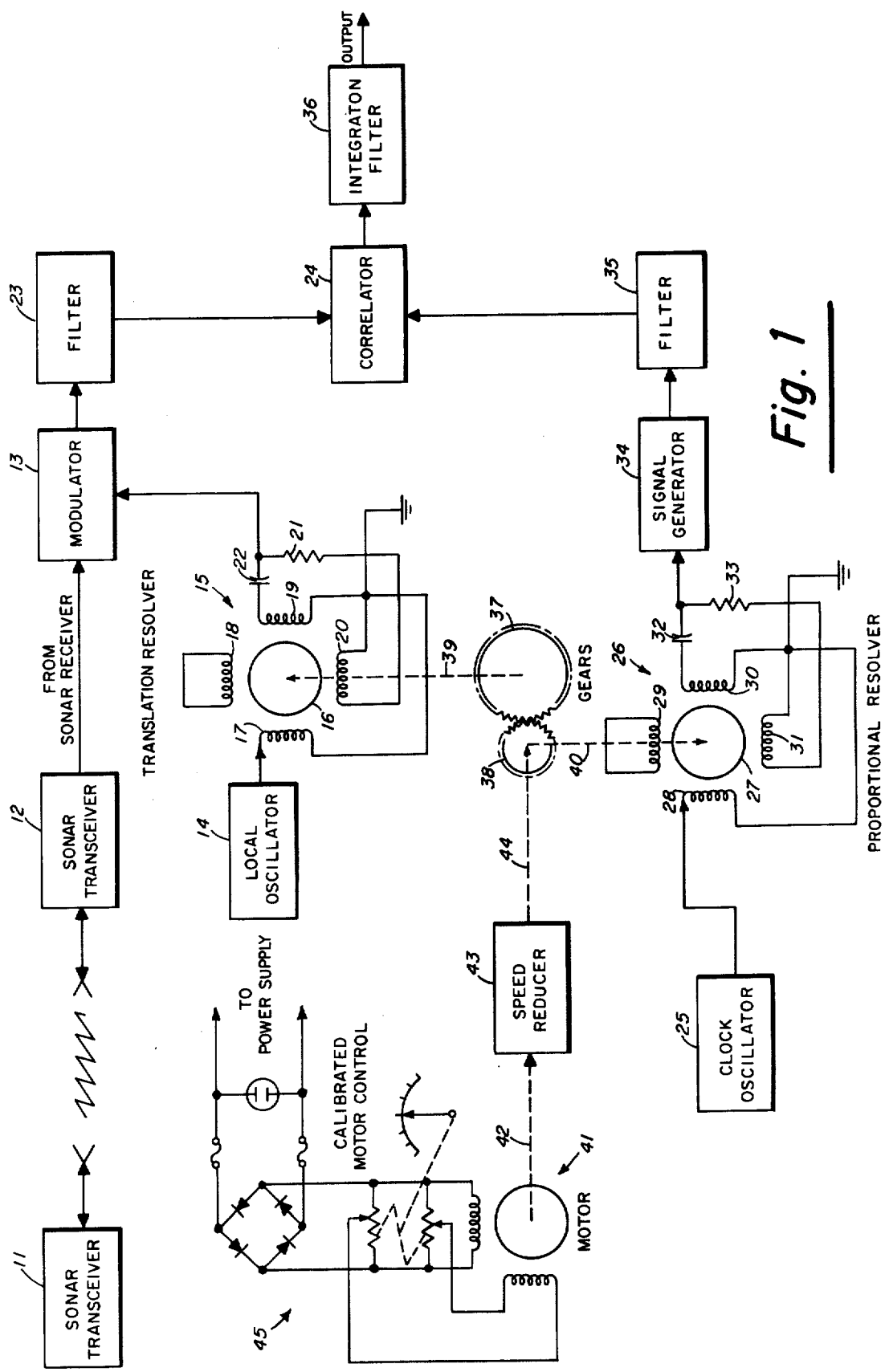

United States Patent [19]

Klund et al.

[11] 4,207,625
[45] Jun. 10, 1980

[54] DOPPLER COMPENSATOR FOR HETERODYNE CORRELATION DEVICES

[75] Inventors: William E. Klund, San Diego, Calif.; Woodrow H. Littrell, late of San Diego, Calif., by Nomah M. Littrell, executrix; Robert D. Isaak, San Diego, Calif.

[73] Assignee: The United States of America as represented by the Secretary of the Navy, Washington, D.C.

[21] Appl. No.: 93,814

[22] Filed: Mar. 6, 1961

[51] Int. Cl.² .............................................. G01S 9/66
[52] U.S. Cl. ................................ 367/135; 367/90; 367/904
[58] Field of Search .............. 340/3, 5, 5 S, 6, 16; 343/7.7, 8, 9, 14, 17.5, 100.7; 181/0.5, 0.51, 0.52; 367/90, 135, 904

[56] References Cited

U.S. PATENT DOCUMENTS

| 2,621,243 | 12/1952 | Sunstein | 340/3 |
| 2,834,956 | 5/1958 | Harris, Jr. | 343/14 |
| 2,839,734 | 6/1958 | Hanley | 340/3 |
| 2,908,888 | 10/1959 | Kirkland | 340/3 |

*Primary Examiner*—Richard A. Farley

*Attorney, Agent, or Firm*—Louis A. Miller; Paul N. Critchlow; Don D. Doty

EXEMPLARY CLAIM

2. In a sonar communication system, a transceiver for receiving doppler signals, a local oscillator for producing a first output signal of given frequency, a translation resolver connected to said local oscillator for regulating said first output signal, a modulator connected to said transceiver and said translation resolver for mixing said received doppler signals and said regulated first output signal, a filter coupled to said modulator for filtering said mixed signals, a precision clock oscillator adapted for producing a second output signal, a proportional resolver electrically coupled to said precision clock oscillator for regulating the frequency of said second output signal, a signal generator connected to said proportional resolver and driven by said regulated second output signal for generating a third output signal, a filter coupled to said signal generator for filtering said third output signal, a correlator electrically coupled to the outputs of said mixed signal filter and said third output signal filter for correlation thereof, a drive motor, means connected to said drive motor for regulating the speed and rotation thereof, and gear means interconnecting said drive motor and said translation and proportional resolvers for driving same at a predetermined speed ratio.

9 Claims, 1 Drawing Figure

DOPPLER COMPENSATOR FOR HETERODYNE CORRELATION DEVICES

The invention described herein may be manufactured and used by or for the Government of the United States of America for governmental purposes without the payment of any royalties thereon or therefor.

The present invention relates generally to frequency controllers and particularly to a sonar heterodyne correlator doppler compensation system for controlling the frequency shifts and band spreading occurring during broadband communication and echo-ranging operations between two or more moving vehicles.

It has been noted that signals transmitted through sea water between communicating ships or submarines experience an increase in frequency with a corresponding increase in bandwidth when the range therebetween is decreasing and a decrease in frequency with a corresponding decrease in bandwidth when the range therebetween is increasing and, thus, there are times when the resulting bandwidth thereof spreads or recedes sufficiently to be adversely affected in the electronic equipment processing such signals to a useful output signal. Furthermore, it has been found that, due to the doppler effects which occur as a result of inherent physical characteristics of the conducting medium interacting with the signals transmitted therethrough, the received signals also may have shifted up or down from their originally transmitted frequency. Because this shift adversely affects the gain of said received signals during processing thereof in the receiving equipment, the signal-to-noise ratio may be decreased considerably. Thus, it is advantageous to simultaneously compensate for these combined undesirable effects in order to provide a more useful output.

As far as is presently known, there are no prior art devices which perform these functions. Perhaps this is due to the fact that the need therefor has only recently arisen in connection with broadband heterodyne correlator systems. However, doppler compensation of narrow frequency band signals has, in the past, been accomplished by use of a bank of adjacent filters at the correlator output sufficiently great in number to accommodate the necessary doppler shift. It is also known to provide doppler compensation of narrow frequency band signals by using several local oscillators or a variable local oscillator at the receiver which has sufficient versatility to accommodate the necessary doppler shift. But these items are limited to narrow band operation and will not produce the desired results when broadband operation is involved.

The present invention overcomes this limitation and enables broadband doppler signals to be usefully employed at optimum power levels by compensating for frequency shift and frequency band spreading. Consequently, the intelligence portion of the received signals are converted to "loud and clear" output signals as the result of processing for improved signal-to-noise ratios.

In addition, in so doing, it would appear to be noteworthy that proper calibration of the subject compensating means provides the ancilliary benefit of indicating the range rate of the moving communicating vessels in knots or miles per hour as desired, as well as providing an input signal to a range counter for range tracking purposes.

It is, therefore, an object of this invention to provide a means for controlling the frequency of a signal so that it is substantially maintained at a predetermined control point.

Another object of this invention is to provide means for compensating for frequency shift and band spreading of broadband signals in a heterodyne correlation system.

A further object of this invention is to provide an improved means for preventing power loss in bandpass filters.

A still further object of this invention is to provide doppler compensation of signals received from a moving communicating vessel in order to effect optimum processing gain thereof.

Another object of this invention is to provide compensation for the translation and proportional components of doppler by means of frequency modification of two independent oscillators.

Another object of this invention is to improve the signal-to-background noise ratio of signals received from a remote moving vessel.

Still another object of this invention is to provide a means for determining and indicating the range rate between moving vessels.

Another object of this invention is to provide means for determining range change and difference between moving vessels for range tracking purposes.

With these and other objects in view, as will hereinafter more fully appear and which will be more particularly pointed out in the appended claims, reference is now made to the following description taken in conjunction with the accompanying drawing in which:

FIG. 1 shows a schematic diagram, partially in box form and partially in detailed form, of the system constituting this invention.

Referring now to the drawing and the preferred embodiment of the invention depicted in FIG. 1, there is shown a first sonar transceiver 11 which may be mounted on a submarine, boat, ship, or other vehicle adapted for movement with respect to the earth's surface. Although shown in this instance as a sonar type transceiver, transceiver 11 may also be an echo-ranging radar system or other communications system adapted for broadcasting and receiving predetermined signals.

Transceiver 11 is shown as communicating with a second sonar transceiver 12 that is substantially identical thereto and may likewise be located on a movable vessel; however, it should be understood that either one may be used to echo-range on a moving target. In such case, obviously only one sonar transceiver is required in order that appropriate signals be transmitted to the target, reflected by the target, and received from the target.

The subject doppler compensation system operates in conjunction with the receiver portions of each of said sonar transceivers, although for the purpose of this disclosure, only the attachment to transceiver 12 is shown. Moreover, in event that communication between two or more vessels is occurring, the doppler compensation systems thereof are all substantially synchronized in a manner to be explained further below.

The output signals of the receiver portion of the transceiver is thus applied to one of two inputs of a balanced type modulator 13. The other of the inputs to modulator 13 originates in a local oscillator 14, the output signal of which is applied thereto through a translation resolver 15. Actually, translation resolver 15 may be of any conventional or otherwise suitable type, but in this preferred embodiment, it is shown as a phase shifting resolver having a rotatable armature 16 comprised of windings 17 and 18 and quadrature field coils 19 and 20. The output signal of local oscillator 14 is electrically coupled to one terminal of winding 17, the other terminal of which is connected to a grounded common junction of one of the terminals of field coils 19 and 20. The other terminal of field coil 20 is coupled through a resistor 21 to said other input of modulator 13. Likewise, the other terminal of field coil 19 is coupled through a capacitor 22 to the aforesaid other input of modulator 13 along with the output from resistor 21. Winding 18 has its terminals shorted.

The modulated sonar receiver signal constituting the output signal from modulator 13 is fed to a low-pass filter 23 which selects the lower sideband thereof and applies it to one of two inputs of a heterodyne correlator 24.

A precision clock oscillator 25 of the type which may, for example, produce accurate output signals of two kilocycles per second, and which is adapted for time synchronization with a similar precision clock oscillator that is incorporated in a like doppler compensation system operating in conjunction with the sonar transceiver located in any remote communicating vessel, such as, for example, the aforementioned transceiver 11.

The precision output signal from clock oscillator 25 is applied to a proportional phase shifting resolver 26 which includes a rotatable armature 27 comprised of windings 28 and 29 and field coils 30 and 31. Said output is actually applied to one terminal of winding 28, the other terminal of which is connected to a common junction of one of the terminals of field coils 30 and 31 and ground. The other terminals of field coils 30 and 31 are interconnected at a common junction through a capacitor 32 and a resistor 33, respectively. The two terminals of winding 29 are shorted.

The output signal from proportional resolver 26 drives at an accurately controlled rate a signal generator 34 which may be, for example, a pseudo noise type or any other conventional type desired and suitable for any given operative conditions. The output of said signal generator 34 is filtered in an appropriate filter 35 before being applied to the aforesaid second input of correlator 24, the output signal of which is then fed as the center frequency of an integration filter 36.

Armatures 16 and 27 of their respective resolvers are interconnected through intermeshing gears 37 and 38 and mechanical drive means such as shafts 39 and 40. Gears 37 and 38 are, in turn, driven by a DC reversible drive motor 41 through a first shaft 42, a speed reducer 43, and second shaft 44 connected to mechanically rotate gear 38. Thus it may be seen that the resolver speeds may be properly controlled by controlling the speed of said motor and proper selection of said gears. For speed control purposes, an appropriate, accurate, and calibrated motor control means 45 of any suitable type is used to regulate the speed and direction of rotation of motor 41.

Briefly, the operation of the doppler compensation system constituting this invention is as follows.

The doppler signal received by the receiver portion of transceiver 12 is fed to modulator 13 where it is shifted up or down in frequency by a regulated output signal from local oscillator 14 heterodyned therewith in accordance with predetermined subsequent output parameter requirements mentioned below. The heterodyned output signal from modulator 13 is then filtered by band-pass filter 23 which passes that portion thereof considered to contain optimum signal-to-noise characteristics, and for such purposes, for example, selection of either of the sidebands may be made. This filtered signal is then applied to correlator 24 where it is further mixed with an appropriate reference signal orginating in signal generator 34 and filtered in filter 35.

In order that the aforesaid reference signal be exceedingly accurate, it is driven by the regulated output of precision clock oscillator 25, which, insofar as is possible, is time synchronized with a like precision clock oscillator of the aforementioned transceiver 11 which, of course, is located in the communicating vessel.

Regulation of the output signals from both the aforesaid local oscillator 14 and the precision clock oscillator 25 is respectively effected by translation resolver 15 and proportional resolver 26, each of which has an armature that rotates at a ratio defined by the gear ratios of gears 38 and 39 and at a speed and in a direction controlled by the speed and direction of rotation of drive motor 41 operating in conjunction with speed reducer 43.

Like the output signal from filter 23, the filtered reference signal from filter 35 is applied to heterodyne correlator 24 for further mixing therein and for producing a compensated output signal which matches the center frequency of integration filter 36. When the correlator output signal matches or substantially matches the center frequency of said integration filter, the output therefrom consists of a signal having vastly improved amplitude fidelity due to the fact that any noise or unwanted signals existing in the signal originally received by transceiver 12 has been reduced considerably with respect to the intelligence portion thereof as a result of compensation for frequency shift and frequency bandspreading effects originally occurring therein.

In order to adjust the frequency of the receiver output signal so that it substantially matches the center frequency of integration filter 36, the resolver drive motor speed and direction is regulated by manual motor control 45. Manually changing the motor speed changes the speeds of both resolver armatures which, in turn, varies the frequencies of the output signals from the local and precision clock oscillators as necessary to provide frequency shift and bandwidth compensation during broadband operation. Obviously, the proper frequency shift and bandwidth corrections are performed by the two gear-synchronized, variable phase shifting resolvers, and that compensation is effective at values of doppler for increasing as well as decreasing range rates provided the resolvers are driven at the correct speeds and have the proper rotational directions. The correct speed ratio between the translation and proportional resolvers is determined by and equal to the ratio of the local oscillator frequency to the clock oscillator frequency and, accordingly, is independent of range rate between communicating vessels or between the echo-ranging vessel and the target. Of course, as suggested above, all values of range rate are accommodated by providing the appropriate speed latitude.

Hence, it can readily be seen that the signal processing effected within the doppler compensation system of this invention results in output signals within a broad operational band containing amplitudes having vastly improved signal-to-noise ratios.

Obviously many modifications and variations of the present invention are possible in the light of the above teachings. It is, therefore, to be understood, that within the scope of the appended claims, the invention may be practiced otherwise than as specifically described.

What is claimed is:

1. A control system for regulating the frequency and bandwidth of doppler signals comprising in combination, means for producing a first signal, means electrically coupled to said producing means for varying the frequency of said first signal, means for receiving doppler signals connected to said frequency varying means for modulating same with said first signal, means coupled to said modulating means for filtering said modulated doppler signal, means for providing a second signal, means electrically coupled to said providing means for varying the frequency of said second signal, means driven by said varied second signal for generating a predetermined third signal, means coupled to said generating means for filtering said third signal, means interconnecting the outputs of said modulated doppler signal filtering means and said third signal filtering means for correlating same, and means interconnecting the aforesaid first and second signal frequency varying means for timely synchronization thereof.

2. In a sonar communication system, a transceiver for receiving doppler signals, a local oscillator for producing a first output signal of given frequency, a translation resolver connected to said local oscillator for regulating said first output signal, a modulator connected to said transceiver and said translation resolver for mixing said received doppler signals and said regulated first output signal, a filter coupled to said modulator for filtering said mixed signals, a precision clock oscillator adapted for producing a second output signal, a proportional resolver electrically coupled to said precision clock oscillator for regulating the frequency of said second output signal, a signal generator connected to said proportional resolver and driven by said regulated second output signal for generating a third output signal, a filter coupled to said signal generator for filtering said third output signal, a correlator electrically coupled to the outputs of said mixed signal filter and said third output signal filter for correlation thereof, a drive motor, means connected to said drive motor for regulating the speed and rotation thereof, and gear means interconnecting said drive motor and said translation and proportional resolvers for driving same at a predetermined speed ratio.

3. A heterodyne correlation doppler compensator for compensating for frequency shift and frequency band spreading of broadband doppler signals received from relatively moving communicating vessels consisting of a local oscillator, a translation resolver coupled to said local oscillator, a modulator adapted to receive a doppler signal as one input thereto and a modulating signal as a second input thereto, differentiator means interconnecting said translation resolver and the second input to said modulator, a first bandpass filter connected to said modulator, a clock oscillator, a proportional resolver coupled to said clock oscillator, a signal generator, differentiator means interconnecting said proportional resolver and said signal generator, a second bandpass filter connected to said generator, a correlator connected between said first and second filters, a gear train connected between said translation and proportional resolvers, a drive motor connected to said gear train, and a calibrated motor control connected to said drive motor.

4. The device of claim 3 wherein said translation and proportional resolvers include rotable armatures effectively connected to each other and said drive motor through said gear train, and wherein said calibrated motor control is calibrated in terms of range rate of the vessels producing the aforesaid broadband doppler signals.

5. A heterodyne correlation doppler compensator for counteracting frequency shifting and frequency band spreading of broadband doppler signals received from relatively moving communicating vessels comprising in combination, means for adjusting the translation component of said broadband doppler signals, means for adjusting the proportional component of said broadband doppler signals, means interconnecting the aforesaid adjusting means for synchronizing same in accordance with a predetermined frequency ratio, means connected to said synchronizing means for driving same, means connected to each of said adjusting means for correlating the adjusted translation and proportional components therefrom and producing a high fidelity output signal within a predetermined frequency range, and means effectively coupled to the aforesaid synchronizing means for regulating said translation and proportional component adjusting means for disposing said high fidelity output signal within said predetermined frequency range.

6. The device of claim 5 wherein said means for adjusting the translation component of said broadband doppler includes a local oscillator, a phase shifting resolver connected to the output of said local oscillator, and a balanced modulator connected for simultaneous response to the output of said phase shifting resolver and the aforesaid broadband doppler signals.

7. The device of claim 5 wherein said means for adjusting the proportional component of said broadband doppler signals includes a precision clock oscillator, a phase shifting resolver connected to the output of said precision clock oscillator, and a signal generator coupled to the output of said phase shifting resolver and driven thereby.

8. The device of claim 5 wherein said means interconnecting the aforesaid adjusting means for synchronizing same in accordance with a predetermined frequency ratio includes a gear train, a pair of shafts each of which respectively connects said gear train to each of said adjusting means, a drive motor, a shaft connected between said drive motor and said gear train, and a calibrated control means connected to said drive motor for controlling the speed thereof.

9. In a sonar communication system, a transceiver, a local oscillator, a translation resolver connected to the output of said local oscillator, a modulator coupled to the outputs of said transceiver and said translation resolver, a first filter coupled to the output of said modulator, a precision clock oscillator, a proportional resolver coupled to the output of said precision clock oscillator, a signal generator connected to the output of said proportional resolver, a second filter connected to the output of said signal generator, a correlator connected for response to the outputs of said first and second filters, an integration filter coupled to the output of said correlator, a drive motor, means connected to said drive motor for regulating the speed and rotation thereof, and means interconnecting said drive motor and said translation and proportional resolvers for driving same at a predetermined speed ratio.

* * * * *